(12) United States Patent
Circlaeys et al.

(10) Patent No.: US 10,579,713 B2
(45) Date of Patent: Mar. 3, 2020

(54) APPLICATION MARKUP LANGUAGE

(71) Applicant: Apple Inc., Cupertino, CA (US)

(72) Inventors: Eric M. Circlaeys, Paris (FR); Guillaume Vergnaud, Tokyo (JP); Ralf Weber, San Jose, CA (US); Dong Young Oh, Saratoga, CA (US); Alexander David Wallace, Cupertino, CA (US); Daniel Hooper, Alpharetta, GA (US); Benjamin David Ross, Tokyo (JP)

(73) Assignee: Apple Inc., Cupertino, CA (US)

( * ) Notice: Subject to any disclaimer, the term of this patent is extended or adjusted under 35 U.S.C. 154(b) by 188 days.

(21) Appl. No.: 14/725,632

(22) Filed: May 29, 2015

(65) Prior Publication Data

US 2015/0347361 A1    Dec. 3, 2015

Related U.S. Application Data

(60) Provisional application No. 62/005,293, filed on May 30, 2014.

(51) Int. Cl.
| | |
|---|---|
| *G06F 17/20* | (2006.01) |
| *G06F 17/22* | (2006.01) |
| *G06F 17/21* | (2006.01) |
| *G06F 16/957* | (2019.01) |
| *G06F 16/958* | (2019.01) |
| *H04N 21/8543* | (2011.01) |

(52) U.S. Cl.
CPC ...... *G06F 17/2247* (2013.01); *G06F 16/9577* (2019.01); *G06F 16/986* (2019.01); *G06F 17/211* (2013.01); *G06F 17/2229* (2013.01); *H04N 21/8543* (2013.01)

(58) Field of Classification Search
CPC .................................................... G06F 17/211
See application file for complete search history.

(56) References Cited

U.S. PATENT DOCUMENTS

| | | | |
|---|---|---|---|
| 8,176,416 B1* | 5/2012 | Williams | G06F 17/2247 715/243 |
| 2001/0056460 A1* | 12/2001 | Sahota | G06F 16/9577 709/201 |
| 2007/0288858 A1* | 12/2007 | Pereira | G06F 9/451 715/764 |
| 2008/0071881 A1* | 3/2008 | Kronlund | G06Q 30/02 709/217 |

(Continued)

*Primary Examiner* — Shahid K Khan
(74) *Attorney, Agent, or Firm* — Invoke

(57) ABSTRACT

An example method may retrieve a markup language document from an electronic storage device. The markup language document may define a component of an interactive media application and a plurality of resolution dependent parameter sets for the component. The method may continue and determine, using at least one processor, a current resolution of a display device of a playback device and select, using the at least one processor, a parameter set of the plurality of resolution dependent parameter sets for the component based on the current resolution and device. The method may also apply, using the at least one processor, the parameter set to the component; and present, using the at least one processor, the component as part of the interactive media application on the playback device.

20 Claims, 8 Drawing Sheets

(56) References Cited

U.S. PATENT DOCUMENTS

| | | | |
|---|---|---|---|
| 2008/0155396 A1* | 6/2008 | Dubinko | G06F 17/2247 |
| | | | 715/251 |
| 2009/0006992 A1* | 1/2009 | Gilboa | G06F 8/38 |
| | | | 715/763 |
| 2009/0228784 A1* | 9/2009 | Drieu | G06F 17/214 |
| | | | 715/235 |
| 2013/0132422 A1* | 5/2013 | Rogish | G06F 17/3089 |
| | | | 707/769 |
| 2013/0191810 A1* | 7/2013 | Brandstetter | G06F 8/34 |
| | | | 717/109 |
| 2013/0211924 A1* | 8/2013 | Yuill | G06Q 30/0277 |
| | | | 705/14.72 |
| 2014/0035945 A1* | 2/2014 | Anglin | G06F 3/14 |
| | | | 345/619 |

* cited by examiner

APPLICATION MARKUP LANGUAGE

CLAIM OF PRIORITY

This application claims the benefit under 35 U.S.C. § 119(e) to U.S. Patent Application Ser. No. 62/005,293, filed May 30, 2014, titled "Application Markup Language," which is hereby incorporated by reference in its entirety.

BACKGROUND

Media content may be presented to users in a variety of ways. For example, a program may generate a stand-alone slideshow movie. The movie may contact static images or video, both at fixed resolutions. In another example, a program may dynamically present a slideshow based on a set of images designated by the user. The program may additionally generate and display transitions between the images and have music playing in the background.

DETAILED DESCRIPTION

Systems and methods disclosed herein may relate to creating an engaging experience with user's media content. Existing slideshow technologies, for instance, may be built for playback rendering (time based) in OpenGL. As user's ability to actively utilize display devices for such slideshows has developed, however, such slideshows may be extended with interactivity support to start to get users more involved with their content. Such extensions may come at a significant cost (OpenGL is complex) and the interaction part may not match the experience people are used to on native applications for a given operating system. The systems and methods disclosed herein may provide an engaging experience leveraging people's media with device capabilities. Such systems and methods may provide interactivity at the core of the system/method with additional playback capabilities, in contrast to systems that build interaction on top of a playback engine, to building interactivity at the core with playback capabilities.

Interactive applications may include a focus on media and the experience; may be native to manufacturer or app provider core technology and default device capabilities; and may have a common structure with applications, widgets, and navigation/navigators.

Some interactive application design programs may require or otherwise utilize skills that conventional content owners may not possess. Systems and methods described herein may include an abstraction engine to simplify building such native experiences. The creation of such application experiences may be simplified by abstracting the native runtime through a higher level language and leverage existing Operating System (OS) layers automatically in order to let users focus on the creativity rather than on the development complexity. Some features of such abstraction may be a platform agnostic generic engine, native mobile or desktop runtimes (e.g., UIKit/AppKit) with the possibility to extend it to other platforms such as the web, providing a framework, a runtime, and an automatic authoring API.

Figure 1:
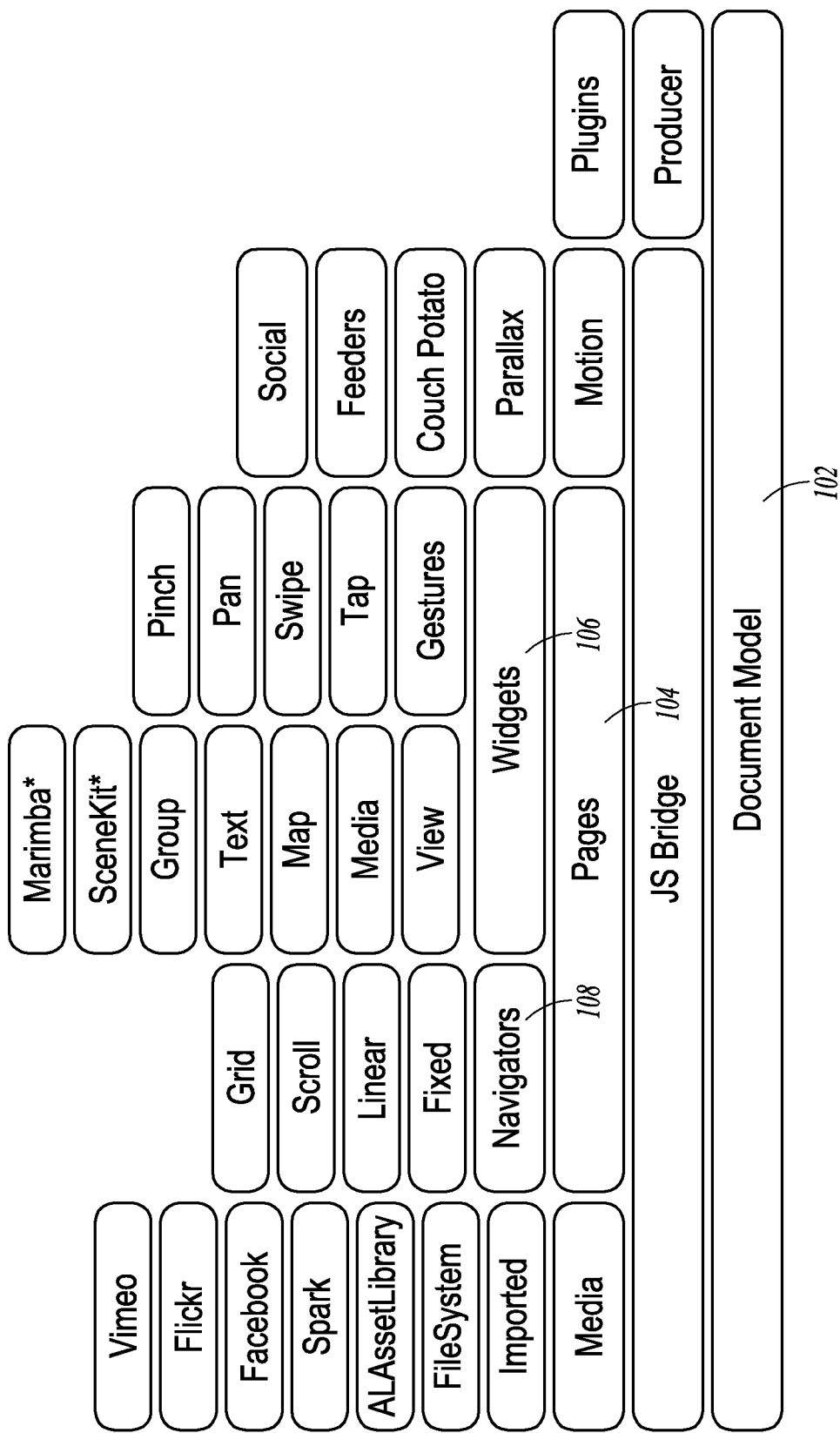
FIG. 1 illustrates a representation of container elements of document model, according to an example embodiment.

FIG. 1 is representation of container elements of document model, according to an example embodiment. As illustrated, a document model 102 includes a number of container elements. One container element may be a page 104 container that are in turn containers for graphical and non-graphical elements that may be called widgets 106 (images, maps, text, animated sprites etc.). Another type of container element, called a navigator 108, may include pages and allows navigation between them or within them. Pages can also contain navigators, making the hierarchy recursive.

In contrast with conventional document display programs and applications, the system disclosed herein may include no or essentially no abstraction between what is described and the native features and classes of the underlying operating system. The features of the operating system may be built upon directly to make the features into items that may be used for media consumption and interactions. A core may provide capabilities and/or functionalities and may implement applications that are substantially different from one another.

It may be approachable even to users with little background in interactive application design to create new slideshows or extend the functionality of the engine (versus low level OpenGL). Systems and methods described herein may provide an abstraction to describe in a markup language (XML) with Scripting capabilities (JS) the principal of a media application defining the navigation, the resources to manipulate, its presentations on screen, the interactivity, the playback, and the like. When executed through a media playback engine, it may produce a real native operating system application using layers and functionalities many or most users may already be used to (gestures, interaction, controls, . . . ). In various examples the document model describes how to manipulate the core components mapping native AppKit/UIKit features and device capabilities, potentially masking at least some of the complexity for the user.

Figure 2:
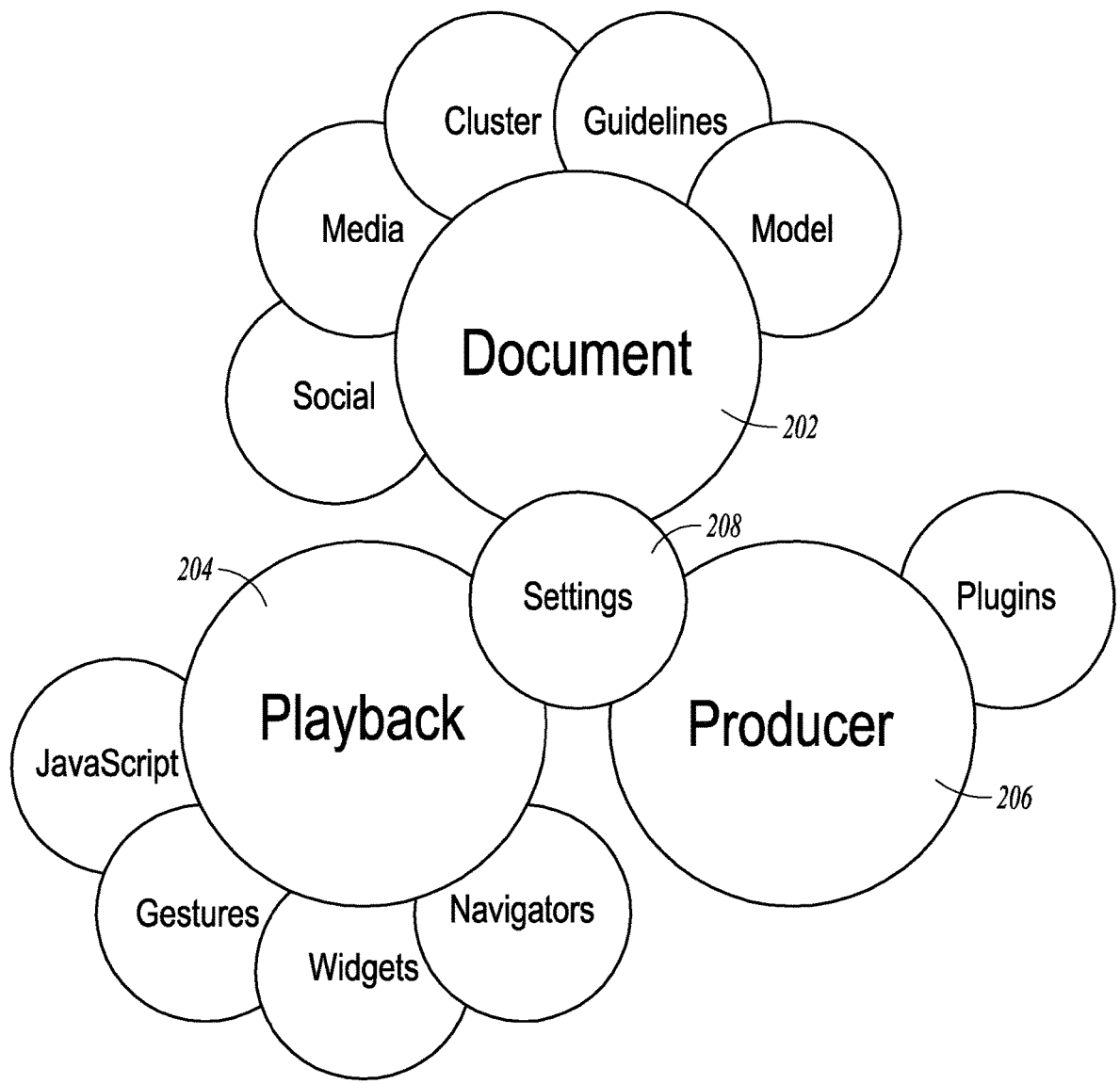
FIG. 2 illustrates a representation of components of an interactive media engine, according to an example embodiment.

FIG. 2 illustrates a representation of components of an interactive media engine, according to an example. The engine work may work in three pieces: (1) a document description component 202; (2) a playback component 204 that renders the document; and (3) a producer component 206 that generates a document and allows editing with extensibility. A settings system component 208 in the middle may be responsible for mapping native objects and a system description representing the communication pipeline from the system disclosed herein to native systems. The engine(s) may provide parameters that are set to certain default values and which may be taken care of by the settings in the core.

In various examples, relatively few lines of code, such as XML, are required to produce a document in which a user may scroll through photos with a pan gesture and with a tap displays additional information (e.g., where this was taken, with a map). A user may also build richer and more advanced document with immersive interaction, such as is illustrated in FIG. 3.

Figure 3:
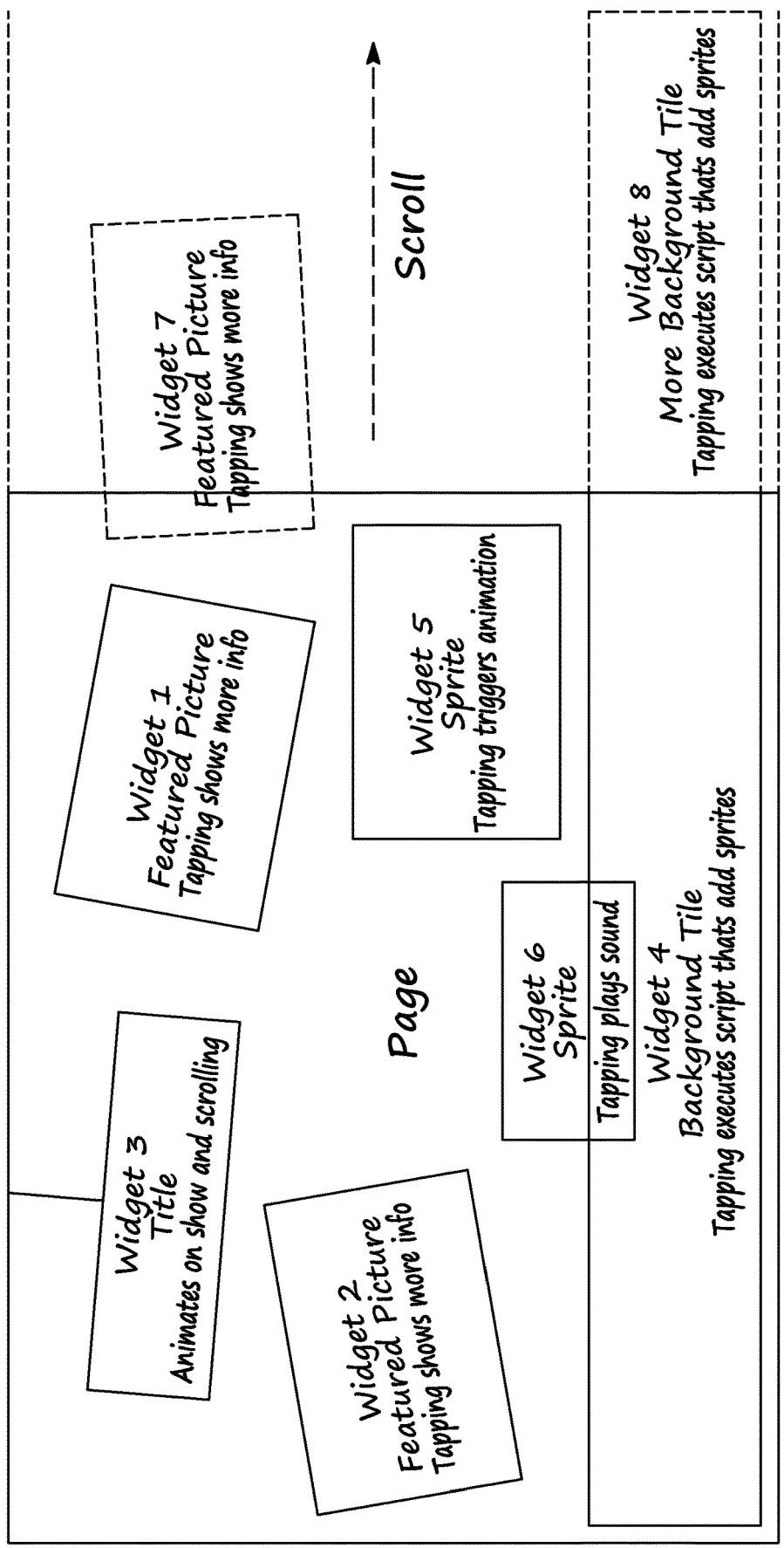
FIG. 3 illustrates an interactive document, according to an example embodiment.

As a user scrolls through the interactive document of FIG. 3 the user may see parallax of the different layers, when using device motion the scene may tilt in along a Y-axis, displaying the depth. Tapping the background may make various sprites appear, the tapping or otherwise selecting of which may make the sprites animate and also animate other widgets, play sound, and so forth. The development of such an application may be achieved with little or no computer coding (except, in certain circumstances, some scripting) and XML.

XML may be utilized to describe how to use features provided by the core, such as the navigators, pages and widgets for the overall structure, then actions/gestures for the interactivity. The features of the core map to features on the operating system. The engine abstracts the manipulation of media resources and manages the optimization of the preloading of the media (low and best resolutions) as well as the lifecycle and recycling of any objects (unload, warm up, and display states). The creation of simple media centric application may thus be comparatively simple and fast for a user and utilize relatively little memory by managing complexity of resultant applications at the core level.

The core provides various primitives, such as a scrollview to media or text elements. Such primitives may be configured directly through XML and accessed by JS if necessary at runtime. The scripting language is used as a bridge to the native operating system code. An example structure may include a listing of files that define various aspects of the interactive document/application such as templates, pages, navigators, and scripts.

The system may start with a root navigator that defines how to navigate through pages, as follows:

```
<plist version="1.0">
<dict>
 <key>root</key>
 <dict>
  <key>class</key>
  <string>OKNavigatorLinearPagesViewController</string>
  <key>pages</key>
  <array>
   <string>page1</string>
   <string>page2</string>
   <string>page3</string>
  </array>
  <key>settings</key>
  <dict>
   <key>transition</key>
   <string>scroll</string>
   <key>orientation</key>
   <string>horizontal</string>
  </dict>
 </dict>
</dict>
</plist>
```

The document structure supports defining re-usable objects through templates of pages or widgets, as follows:

```
<plist version="1.0">
<dict>
 <key>pages</key>
 <dict>
  <key>Photo Section</key>
  <dict>
   <key>widgets</key>
   <array>
    <dict>
     <key>class</key>
     <string>OKWidgetTextView</string>
     <key>name</key>
     <string>date1</string>
     <key>settings</key>
     <dict>
      <key>@frame</key>
      <dict>
       <key>1024x768</key>
       <string>{{30, 30}, {340, 46}}</string>
      </dict>
      <key>fontName</key>
      <string>HelveticaNeue</string>
      <key>@fontSize</key>
      <dict>
       <key>1024x768</key>
       <real>17.0</real>
      </dict>
      <key>textColor</key>
      <string>{1, 1, 1, 1}</string>
      <key>textAlignment</key>
      <string>NSTextAlignmentLeft</string>
     </dict>
    </dict>
   </array>
  </dict>
  <key>widgets</key>
  <dict>
  </dict>
 </dict>
</plist>
```

A page defines the content to display, in various examples using templates, as follows:

```
<plist version="1.0">
<dict>
 <key>page1</key>
 >dict>
  <key>template</key>
  <string>Photo Section</string>
  <key>settings</key>
  <dict>
   <key>date1.text</key>
   <string>June 15-24, 2012</string>
   <key>title1.text</key>
   <string>Hawaii 2012</string>
   <key>description1.text</key>
   <string>We spent 10 days on the Big Island of Hawaii and saw lots of sights. Here are a few highlights from our trip.</string>
   <key>media1.url</key>
   <string>imported://8E5EC9F6-9065-4A46-8D5F-16C77E02AF21</string>
  </dict>
 </dict>
</plist>
```

The markup language describes directly the native classes to instantiate and manipulate its exposed parameters (such as OKWidgetTextView in the previous example). The settings engine may be utilized for settings support accessing current object properties from a key, or a specific object in a hierarchy using a key path.

Properties of the objects below may be overwritten by referring to them through key paths using for example from pages settings, e.g., "<widget name>.<sub widget name>.<sub widget name>.<property name>".

Underneath, the engine may map the settings to the proper value types and convert the setting properly to assign the setting to the native object. The engine may support simple types up to complex dynamic classes instantiation, all of which may be described in XML and manipulated dynamically by the scripts (JS). The settings described herein may be expressed to support multiple resolutions.

Some or all properties defined in a document may be resolution or platform dependent, as appropriate. For example, by default a property may be defined as follows:

```
<key>settings</key>
<dict>
    <key>frame</key>
    <string>{{436, 100}, {152, 152}}</string>
</dict>
```

By adding '@' before the property name, it enables the use of resolution and platforms filtering.

The following is an example using the resolutions:

```
<key>settings</key>
<dict>
    <key>@frame</key>
    <dict>
        <key>1024x768</key>
        <string>{{436, 100}, {152, 152}}</string>
        <key>768x1024</key>
        <string>{{308, 100}, {152, 152}}</string>
    </dict>
</dict>
```

Another one using platforms illustrates mixing multiple combinations:

```
<key>settings</key>
<dict>
    <key>@frame</key>
    <dict>
        <key>1024x768@ipad,iphone</key>
        <string>{{436, 100}, {152, 152}}</string>
        <key>1024x768@desktop</key>
        <string>{{436, 100}, {200, 200}}</string>
        <key>768x1024</key>
        <string>{{308, 100}, {152, 152}}</string>
    </dict>
</dict>
```

In certain examples, platforms filtering which is also supported. In various examples, the '*' may be a fallback when none have been found:

```
<key>settings</key>
<dict>
    <key>@frame</key>
    <dict>
        <key>ipad,iphone</key>
        <string>{{436, 100}, {152, 152}}</string>
        <key>desktop</key>
        <string>{{436, 100}, {200, 200}}</string>
        <key>*</key>
        <string>{{308, 100}, {152, 152}}</string>
    </dict>
</dict>
```

Filtering may be ordered as follows: "resolution@platform", resolution with platform, resolution only, platform only, then the wildcard. Document settings may be utilized to support live resize, keeping the aspect ratio or not, if not the values will be automatically normalized and resized. Internally the settings supporting this may take care of the size scaling factor.

Resolution format strings may drive the document view presentation and rendering based on aspect ratio (or resolutions for fine grained needs) and platforms (with support for "magic layout", as disclosed herein). Multiple resolutions per device are supported; the document view controller may use the closest resolution to the display size by default. Also it can be used to forward specific results to other ones.

Possible supported setup for resolutions:

```
(+)<width>x<height>[=<width>x<height>][@[<iphone>[,
<ipad>[,<desktop>[,<appletv>[,<web>]]]]]]
```

Examples: "1024x768", "1024x768@desktop", "1024x768@desktop,ipad,iphone", "+1024x768@desktop", "+4x3" When a resolution is picked based on a display size, then the settings responding to the resolved resolution may be used (for example if the resolution picked for a 2048x1536 display size on desktop is "+1024x768@ipad,iphone,desktop" the settings key for the resolution specific settings values will be 1024x768@desktop").

"1024x768"!=>We render everything to the display size keeping the aspect ratio and centering the result (scale to fit). Because it specifies 1024x768, all the defined settings frames are relative to this one, meaning that when resized these gets normalized and scaled appropriately. Frames are not the only one that could scales automatically based on the layouts, font size and others can too.

"+1024x768"!=>Some or all of the content may be rendered to the display size (fill). Because it specifies 1024x768, some or all of the defined settings frames are relative to this one, meaning that when resized these gets normalized and scaled appropriately. Aspects of content and the output of the systems and methods disclosed herein may also scale automatically for or based on factors such as the layouts font size.

Resolution forwarding may also be utilized for advanced restrictions. In an example, if "+1024x768" is desired for all platforms but certain types of user devices (e.g., certain types of handheld devices or tablet computers) to support portrait, the following command may be utilized: 768x1024=1024x768@tablet_x,handhelddevice_y", "1024x768@tablet_x,handhelddevice_y"

An example of how a document may be described follows.

Hello World!!

The purpose of this page is to create a document by hand exposing some of the power of the model.

First and foremost, let's create a simple document with the bare minimum to run and display a hello world.

Here is the document bundle structure:

```
TestHelloWorld1.opus/
    Navigators.plist
    Pages.plist
```

The "Navigators.plist" file may describe how pages are assembled, and refer to the "root" entry point of the document. In an example, a single page using a fixed navigator would be sufficient to establish such a file.

```
<?xml version="1.0" encoding="UTF-8"?>
<!DOCTYPE plist PUBLIC "-//Apple//DTD PLIST 1.0//EN"
"http://www.apple.com/DTDs/
PropertyList-1.0.dtd">
<plist version="1.0">
<dict>
    <key>root</key>
    <dict>
        <key>class</key>
        <string>OKNavigatorFixedViewController</string>
        <key>pages</key>
        <array>
            <string>page1</string>
        </array>
    </dict>
</dict>
</plist>
```

A "Pages.plist" file may describe pages. Pages may be composed by one or more of widgets and a navigator. In the below example, background widget will be created to color a space and have some centered text on top. In an example, the default resolution for any document if not specified is 1024×768.

```
<?xml version="1.0" encoding="UTF-8"?>
<!DOCTYPE plist PUBLIC "-//Apple//DTD PLIST 1.0//EN"
"http://www.apple.com/DTDs/
PropertyList-1.0.dtd">
<plist version="1.0">
<dict>
    <key>page1</key>
    <dict>
        <key>widgets</key>
        <array>
            <dict>
                <key>class</key>
                <string>OKWidgetLabelView</string>
                <key>name</key>
                <string>label</string>
                <key>settings</key>
                <dict>
                    <key>frame</key>
                    <string>{{0, 0}, {1024, 768}}</string>
                    <key>fontSize</key>
                    <real>42</real>
                    <key>textColor</key>
                    <string>{0.0, 0.0, 0.0, 1}</string>
                    <key>textAlignment</key>
                    <string>center</string>
                    <key>text</key>
                    <string>Hello World!</string>
                </dict>
            </dict>
            <dict>
                <key>class</key>
                <string>OKWidgetView</string>
                <key>name</key>
                <string>background</string>
                <key>settings</key>
                <dict>
                    <key>frame</key>
                    <string>{{0, 0}, {1024, 768}}</string>
                    <key>backgroundColor</key>
                    <string>{0.98, 0.77, 0.27, 1}</string>
                </dict>
            </dict>
        </array>
    </dict>
</dict>
</plist>
```

In various examples, templates and widgets may also be generated. A generated document may be ready to play in an application or software configured to display such documents. The document may be copied to an application documents and the application may be run to display the document.

The below example may be utilized to create a page template called "Title" and a widget template called "Logo". The page may use the "Title" page template which will use the "Logo" widget template.

The "Templates.plist" file may look as follows:

```
<?xml version="1.0" encoding="UTF-8"?>
<!DOCTYPE plist PUBLIC "-//Apple//DTD PLIST 1.0//EN"
"http://www.apple.com/DTDs/
PropertyList-1.0.dtd">
<plist version="1.0">
<dict>
    <key>pages</key>
    <dict>
        <key>Title</key>
        <dict>
            <key>widgets</key>
            <array>
                <dict>
                    <key>template</key>
                    <string>Logo</string>
                    <key>name</key>
                    <string>media</string>
                    <key>settings</key>
                    <dict>
                        <key>frame</key>
                        <string>{{436, 100}, {152, 152}}</string>
                    </dict>
                </dict>
                <dict>
                    <key>class</key>
                    <string>OKWidgetLabelView</string>
                    <key>name</key>
                    <string>label</string>
                    <key>settings</key>
                    <dict>
                        <key>frame</key>
                        <string>{{0, 0}, {1024, 768}}</string>
                        <key>fontSize</key>
                        <real>42</real>
                        <key>textColor</key>
                        <string>{0.0, 0.0, 0.0, 1}</string>
                        <key>textAlignment</key>
                        <string>center</string>
                        <key>text</key>
                        <string>Hello World!</string>
                    </dict>
                </dict>
                <dict>
                    <key>class</key>
                    <string>OKWidgetView</string>
                    <key>name</key>
                    <string>background</string>
                    <key>settings</key>
                    <dict>
                        <key>frame</key>
                        <string>{{0, 0}, {1024, 768}}</string>
                        <key>backgroundColor</key>
                        <string>{0.98, 0.77, 0.27, 1}</string>
                    </dict>
                </dict>
            </array>
        </dict>
    </dict>
    <key>widgets</key>
    <dict>
        <key>Logo</key>
        <dict>
            <key>class</key>
            <string>OKWidgetMediaView</string>
            <key>settings</key>
            <dict>
                <key>url</key>
                <string>imported://
```

-continued

```
                1367953541b5328b06df06f17f2a6d245f6eb98f</string>
            </dict>
        </dict>
    </dict>
</plist>
```

And the simplified "Pages.plist":

```
<?xml version="1.0" encoding="UTF-8"?>
<!DOCTYPE plist PUBLIC "-//Apple//DTD PLIST 1.0//EN"
"http://www.apple.com/DTDs/
PropertyList-1.0.dtd">
<plist version="1.0">
<dict>
    <key>page1</key>
    <dict>
        <key>template</key>
        <string>Title</string>
    </dict>
</dict>
</plist>
```

Settings of an object hierarchy may be overwritten as far as the parent. To do so a key path may be used instead of a key. In an example, the widget "media" position from the page description may be changed even if defined by the template "Title" as well as increase the font size of the widget "media". In an example, "Pages.plist" would look like:

```
<?xml version="1.0" encoding="UTF-8"?>
<!DOCTYPE plist PUBLIC "-//Apple//DTD PLIST 1.0//EN"
"http://www.apple.com/DTDs/
PropertyList-1.0.dtd">
<plist version="1.0">
<dict>
    <key>page1</key>
    <dict>
        <key>template</key>
        <string>Title</string>
        <key>settings</key>
        <dict>
            <key>media.frame</key>
            <string>{{436, 592}, {152, 152}}</string>
            <key>label.fontSize</key>
            <real>100</real>
        </dict>
    </dict>
</dict>
</plist>
```

In an example, both 1024×768 (landscape) and 768×1024 (portrait) may be supported in a document. Various specific settings may be defined per resolution.

The "Info.plist" may describe specific settings for the overall document.

```
<?xml version="1.0" encoding="UTF-8"?>
<!DOCTYPE plist PUBLIC "-//Apple//DTD PLIST 1.0//EN"
"http://www.apple.com/DTDs/
PropertyList-1.0.dtd">
<plist version="1.0">
<dict>
    <key>resolutions</key>
    <array>
        <string>1024×768</string>
        <string>768×1024</string>
    </array>
</dict>
</plist>
```

"Templates.plist" may be updated accordingly, including with settings using @key or @keypath:

```
<?xml version="1.0" encoding="UTF-8"?>
<!DOCTYPE plist PUBLIC "-//Apple//DTD PLIST 1.0//EN"
"http://www.apple.com/DTDs/
PropertyList-1.0.dtd">
<plist version="1.0">
<dict>
    <key>pages</key>
    <dict>
        <key>Title</key>
        <dict>
            <key>widgets</key>
            <array>
                <dict>
                    <key>template</key>
                    <string>Logo</string>
                    <key>name</key>
                    <string>media</string>
                    <key>settings</key>
                    <dict>
                        <key>@frame</key>
                        <dict>
                            <key>1024×768</key>
                            <string>{{436, 100}, {152, 152}}</string>
                            <key>768×1024</key>
                            <string>{{308, 100}, {152, 152}}</string>
                        </dict>
                    </dict>
                </dict>
                <dict>
                    <key>class</key>
                    <string>OKWidgetLabelView</string>
                    <key>name</key>
                    <string>label</string>
                    <key>settings</key>
                    <dict>
                        <key>@frame</key>
                        <dict>
                            <key>1024×768</key>
                            <string>{{0, 0}, {1024, 768}}</string>
                            <key>768×1024</key>
                            <string>{{0, 0}, {768, 1024}}</string>
                        </dict>
                        <key>fontSize</key>
                        <real>42</real>
                        <key>textColor</key>
                        <string>{0.0, 0.0, 0.0, 1}</string>
                        <key>textAlignment</key>
                        <string>center</string>
                        <key>text</key>
                        <string>Hello World!</string>
                    </dict>
                </dict>
                <dict>
                    <key>class</key>
                    <string>OKWidgetView</string>
                    <key>name</key>
                    <string>background</string>
                    <key>settings</key>
                    <dict>
                        <key>@frame</key>
                        <dict>
                            <key>1024×768</key>
                            <string>{{0, 0}, {1024, 768}}</string>
                            <key>768×1024</key>
                            <string>{{0, 0}, {768, 1024}}</string>
                        </dict>
                        <key>backgroundColor</key>
                        <string>{0.98, 0.77, 0.27, 1}</string>
                    </dict>
                </dict>
```

```
            </array>
        </dict>
    </dict>
    <key>widgets</key>
    <dict>
        <key>Logo</key>
        <dict>
            <key>class</key>
            <string>OKWidgetMediaView</string>
            <key>settings</key>
            <dict>
                <key>url</key>
                <string>imported://
1367953541b5328b06df06f17f2a6d245f6eb98f</string>
            </dict>
        </dict>
    </dict>
</dict>
</plist>
```

In an example, a widget "media" position and widget "label" size may be different depending on the resolutions in "Pages.plist".

```
<?xml version="1.0" encoding="UTF-8"?>
<!DOCTYPE plist PUBLIC "-//Apple//DTD PLIST 1.0//EN"
"http://www.apple.com/DTDs/
PropertyList-1.0.dtd">
<plist version="1.0">
<dict>
    <key>page1</key>
    <dict>
        <key>template</key>
        <string>Title</string>
        <key>settings</key>
        <dict>
            <key>media.@frame</key>
            <dict>
                <key>1024x768</key>
                <string>{{436, 516}, {152, 152}}</string>
                <key>768x1024</key>
                <string>{{308, 100}, {152, 152}}</string>
            </dict>
            <key>label.@fontSize</key>
            <dict>
                <key>1024x768</key>
                <real>100</real>
                <key>768x1024</key>
                <real>50</real>
            </dict>
        </dict>
    </dict>
</dict>
</plist>
```

In various examples, Javascript may be used to manipulate a document through actions. Different type of actions triggered when pages are displayed, for example, or through gestures.

In an example, a simple tap gesture on the page widget "media" may change its position only in landscape in "pages.plist".

```
<?xml version="1.0" encoding="UTF-8"?>
<!DOCTYPE plist PUBLIC "-//Apple//DTD PLIST 1.0//EN"
"http://www.apple.com/DTDs/
PropertyList-1.0.dtd">
<plist version="1.0">
<dict>
    <key>page1</key>
    <dict>
        <key>template</key>
        <string>Title</string>
        <key>settings</key>
```

```
        <dict>
            <key>media.@frame</key>
            <dict>
                <key>1024x768</key>
                <string>{{436, 516}, {152, 152}}</string>
                <key>768x1024</key>
                <string>{{308, 100}, {152, 152}}</string>
            </dict>
            <key>media.actionBindings</key>
            <dict>
                <key>tap</key>
                <dict>
                    <key>class</key>
                    <string>OKActionBindingTap</string>
                    <key>settings</key>
                    <dict>
                        <key>actionScript</key>
                        <string>
                            function animations( ) {
                                widget.center =
PointMake(Math.floor((Math.random( )*872)+76),
Math.floor((Math.random( )*616)+76));
                            }
                            OKWidgetView.animate(0.25, 0, 0,
animations, function(finished) { completionHandler(finished, null); })
                        </string>
                    </dict>
                </dict>
            </dict>
            <key>label.@fontSize</key>
            <dict>
                <key>1024x768</key>
                <real>100</real>
                <key>768x1024</key>
                <real>50</real>
            </dict>
        </dict>
    </dict>
</dict>
</plist>
```

As will be disclosed further herein, while a document may not have a complex structure of pages to navigate into, the content of the unique page may still be manipulated. In an example, a logo multiple may be animated multiple times sharing the Javascript code to the whole context for re-use.

Here is an example document bundle structure:

```
TestHelloWorld7.opus/
    Info.plist
    Navigators.plist
    Templates.plist
    Pages.plist
    Couches.plist
    Script.js
    Resources/
        1367953541b5328b06df06f17f2a6d245f6eb98f/
            media.jpeg
            metadata.plist
            thumbnail.jpeg
            Thumbnails.nosync/
```

The "Info.plist" may be updated with some "couch potato" specific elements:

```
<?xml version="1.0" encoding="UTF-8"?>
<!DOCTYPE plist PUBLIC "-//Apple//DTD PLIST 1.0//EN"
"http://www.apple.com/DTDs/
PropertyList-1.0.dtd">
<plist version="1.0">
```

```
<dict>
    <key>resolutions</key>
    <array>
        <string>1024x768</string>
        <string>768x1024</string>
    </array>
    <key>couchPotatoSupported</key>
    <true/>
    <key>couchPotatoDelay</key>
    <real>10</real>
</dict>
</plist>
```

"Script.js" may allow for the sharing of Javascript code for the whole document execution context:

```
function animateWidgetRandomly(widget) {
    widget.center = PointMake(Math.floor((Math.random( )*872)+76),
Math.floor((Math.random( )*616)+76));
```

"Couches.plist" describes a playing scenario through a set of Javascript actions:

```
<?xml version="1.0" encoding="UTF-8"?>
<!DOCTYPE plist PUBLIC "-//Apple//DTD PLIST 1.0//EN"
"http://www.apple.com/DTDs/
PropertyList-1.0.dtd">
<plist version="1.0">
<dict>
    <key>root</key>
    <dict>
        <key>steps</key>
        <array>
            <dict>
                <key>anchorPage</key>
                <string>page1</string>
                <key>script</key>
                <string>
                </string>
                <key>duration</key>
                <real>5</real>
            <dict>
            <dict>
                <key>anchorPage</key>
                <string>page1-intermediate</string>
                <key>script</key>
                <string>
                    function animations( ) {
                        animateWidgetRandomly(page.
                            widgets['media']);
                    }
                    OKWidgetView.animate(1.0, 0, 0, animations,
                        null)
                </string>
                <key>duration</key>
                <real>5</real>
            </dict>
            <dict>
                <key>anchorPage</key>
                <string>page1-intermediate</string>
                <key>script</key>
                <string>
                    function animations( ) {
                        animateWidgetRandomly(page.
                            widgets['media']);
                    }
                    OKWidgetView.animate(1.0, 0, 0, animations,
                        null)
                </string>
                <key>duration</key>
                <real>5</real>
            </dict>
            <dict>
                <key>anchorPage</key>
                <string>page1-intermediate</string>
                <key>script</key>
                <string>
                    function animations( ) {
                        animateWidgetRandomly(page.
                            widgets['media']);
                    }
                    OKWidgetView.animate(1.0, 0, 0, animations,
                        null)
                </string>
                <key>duration</key>
                <real>5</real>
            </dict>
            <dict>
                <key>anchorPage</key>
                <string>page1-intermediate</string>
                <key>script</key>
                <string>
                    function animations( ) {
                        animateWidgetRandomly(page.
                            widgets['media']);
                    }
                    OKWidgetView.animate(1.0, 0, 0, animations,
                        null)
                </string>
                <key>duration</key>
                <real>5</real>
            </dict>
        </array>
    </dict>
</dict>
</plist>
```

Figure 4:
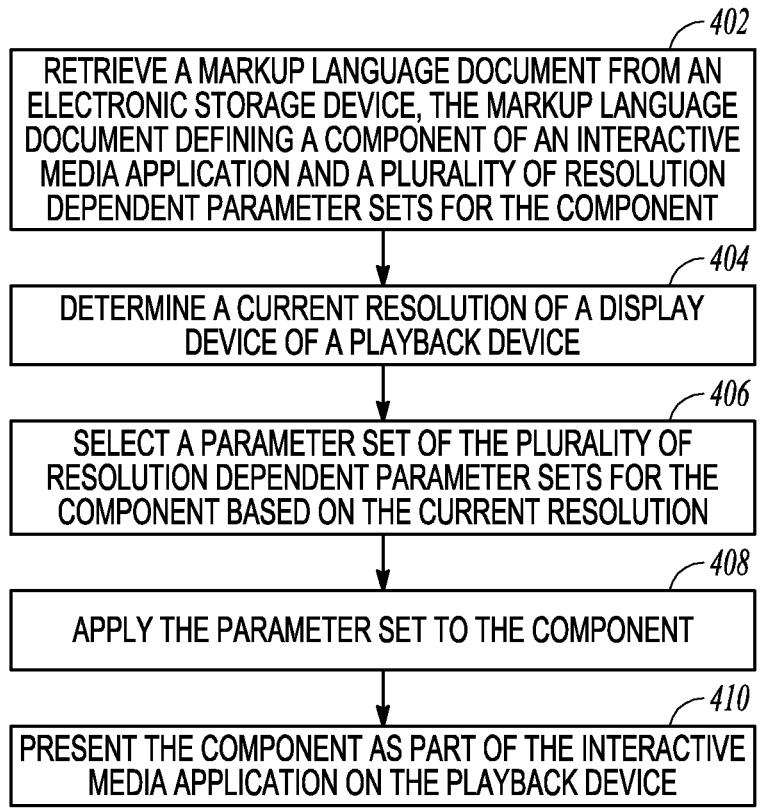
FIG. 4 illustrates a method of using a resolution-independent markup language document, according to an example embodiment.

FIG. 4 illustrates a method of using a resolution-independent markup language document, according to an example embodiment. In an example at operation 402, a markup language document (MLD) may be retrieved from an electronic storage device. The electronic storage device may reside on the device that presents the document or in a separate location. The MLD may be formatted in the manner described above to create an interactive media application playable on multiple types of devices with different resolutions.

For example, the MLD may define a number of pages and components (e.g., media, text boxes, maps) that may be displayed as part of a page in the interactive application. The component may have different parameter sets defined in the MLD for different resolutions, different devices/platforms, or combinations of resolutions and platforms. There may also be default parameter sets for when the playback device does not directly match one of the defined parameter sets. The parameter sets may be based on the type of component. For example, if the component is a display frame that is displayed on a page, the parameter set may include a background color and position/size data. Whereas the parameters of a text box may be a font and font size.

In various examples, the MLD may be opened using an interactive media engine (e.g., such as illustrated in FIG. 2). At operation 404, the interactive media engine may determine a current resolution of a display device of a playback device. The playback device may be part of the same system that the interactive media engine resides upon or be external to that system. The interactive media engine may also determine the platform (e.g., OS) and type (tablet, phone, TV) of the playback device.

In various examples, at operation 406, the interactive media engine selects a parameter set of a plurality of resolution dependent parameter sets for a component. The parameter set may be selected in the manner described above (e.g., the closest available resolution may be used if the resolution of the playback device is not defined in the MLD). The parameter set may be further selected based on the determined platform type.

Once the proper parameter set has been determined, at operation 408, the parameter set may be applied to the component. In various examples, applying a parameter set means using the parameters in the set for the component when the component is rendered/displayed on the display device. If an exact match was not found the, the parameter settings of the closest match may be scaled to the current resolution of the device. In other examples, the parameter set is used as-is.

In various examples, at operation 410, the component with the applied parameters may be presented as part of the interactive application on the display device of the playback device. During presentation of the interactive media application, the media engine may detect a resolution change. For example, a user may rotate a tablet device to landscape mode from portrait. The media engine may then select a parameter set for a displayed component based on the different resolution and apply the new parameter set. In an example, the same parameter set may be used for different resolutions. The MLD may also define a script to execute when user interaction with the interactive media application has ceased for a threshold amount of time The systems and methods disclosed herein may provide a set of native AppKit/UIKit and device core functionalities that may be used in document description and scripting. This functionality may be extended for advanced needs. A plugin structure may be used that that may delivers several features for the purposes of generating documents, such as slideshows, and making the creation/manipulation of such documents unique in the context of the system.

The producer plugins may provide one or more of the following capabilities: core functionality extension; smart producer for automatic authoring and live editing; downloadable. A producer plugin may be seen as a theme in the slideshow context, which makes a unique theme mechanism with extensibility of the engine and smart logic for authoring and live editing with an external component. A producer plugin may be based on a markup language and may be utilized to build themes that appear distinctly different from one another.

The plugins may be dynamically loaded at runtime when a document refers to it or when generating a new document based on a particular plugin. Because the system and method are mapping, and in certain circumstances directly mapping the runtime classes available in the engine, some or all new exposed classes in the plugins may be referenced in the document model and, owing at least in part to the internal settings mapping system, some or all the properties can be manipulated as well in the XML as well as through the JS scripting. Such extensions may be whitelisted at the plugin load time and may inherit from main classes to be accessible at runtime, for instance to improve security. Hence, in various examples, a plugin can extend: navigators; widgets; actions; filters; effects; and transitions. The core may provide the most common primitives and foundation for most documents and let the plugin extend the functionalities with specific needs.

In an example, one component resides in the producer logic which drives authoring and live editing. In various examples of the system, theme architecture has been separate from the core. As such, a user may, in various circumstances, have full control of a dedicated plugin of authoring and live editing. The core may be considered independent as the core may only refer to playing/interacting with a document (e.g., as a standalone application). By contrast, the producer plugin may provide ways of creating such documents and supporting live editing of them. A producer plugin can use the engine in different forms, making the produced document unique. Such documents may be non-understandable by other plugins, in various examples. Some, most, or all of the control is given to the plugin for authoring but the entry points may maintained on the core side for authoring a new document or re-authoring from an existing document or editing pieces.

Figure 5:
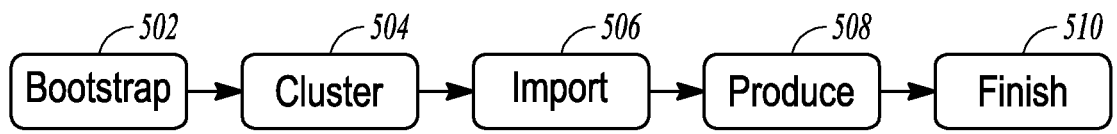
FIG. 5 illustrates a workflow for a producer component, according to an example embodiment.

A producer plugin may respond to a series of operations, as illustrated in FIG. 5. In an example at bootstrap operation 502, a produce plugin may share session setup across all other operations; prepare, if new document, author with same producer or on a different producer; prepare with producer specific guidelines; and perform document cleanup—reset document model and Remove all embedded resources but media.

In an example, at cluster operation 504 the producer plugin may: ingest media items metadata; leverage clustering algorithms with predicate systems to group media; and update guidelines.

At import operation 506, a producer plugin may: if a document is flatted and can be referenced, import plugin resources to document; limit references to plugins within an application bundle; and, if plugin content is referenced, determine a plugin version to open.

Figure 6:
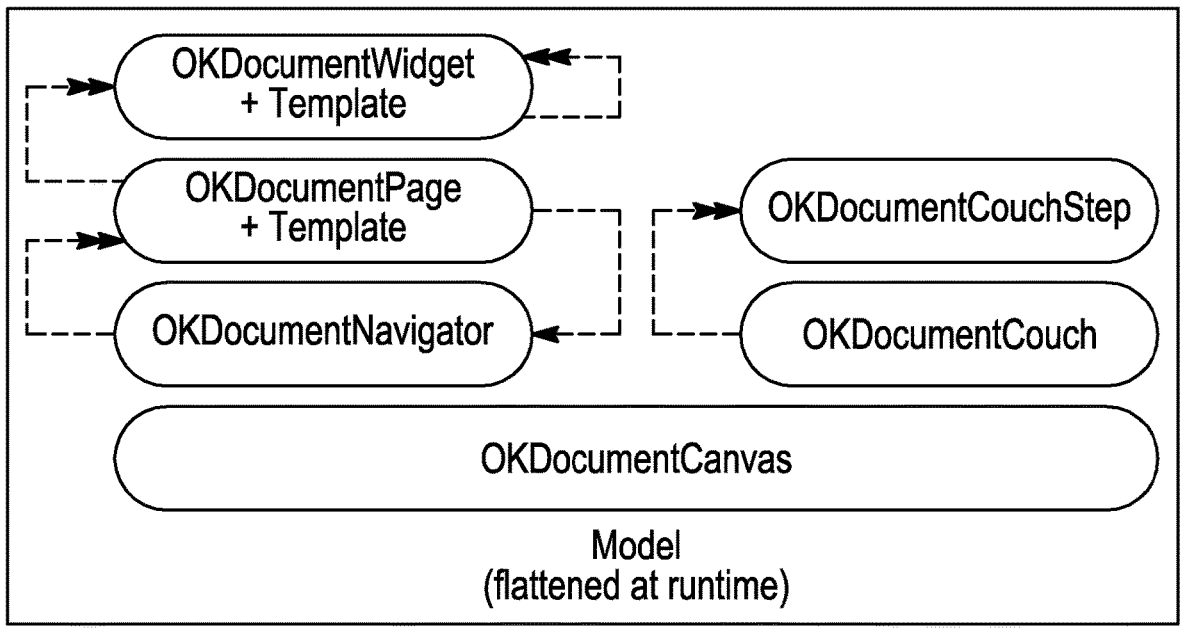
FIG. 6 illustrates a workflow for generating a document model, according to an example embodiment.

In an example, at produce operation 508, the plugin may generate the document mode and scripts. At finish operation 510, the plugin may generate a preview, update guidelines, and cleanup the session. FIG. 6 illustrates a workflow for generating the document model. The core may also provide an API for manipulating the model.

In addition to smart authoring, the producer plugin may, in various examples, be the only plugin that can drive live editing of the document as the producer plugin may know how to update the model and guidelines. Some components in the core support live editing, such as text fields to allow setting a caption among other mechanisms. When a document is in editing mode, an editing action to such a component may go through the producer plugin first to decide if the document can be edited and then to confirm the editing settings, thereby allowing a fine-tuned control of such a plugin for the interaction (e.g., live editing) of a document.

Giving such capabilities to plugins disclosed herein may allow for new features and relatively quick product extension. Such capabilities may additionally isolate, at least in part, to defined group some or all of the loadable/running code and resources for a particular plugin. Such isolation may permit sharing plugins through networked and "cloud" connections. The system may support referring producer plugins within the cloud and download the plugins on demand when necessary, taking care of versioning and re-authoring if necessary.

A producer plugin can be delivered in two parts: a plugin bundle, which comes with executable code for the smart authoring and live editing, core extensibility, and resources; and a content bundle, which may include resources such as images, videos, and so forth. The plugin bundle may be sufficient for a variety of application, but the content bundle may provide extra flexibility for themes that uses large resources. The following designs may be supported: local producer plugin; local producer plugin plus a downloadable on demand content bundle; downloadable producer plugin; downloadable producer plugin plus a downloadable on demand content bundle.

In other systems, a theme may only provide resources and layouts. In such other systems, a theme may not provide logic for building a document, nor extend the core functionality. In the system disclosed herein, the plugin architecture may extend the feature set and make themes unique by giving substantial or full control to the producing chain.

An interactive document made with the system described herein may describe the presentation, interaction and playback experience of media. Each produced documents may be very different and a producer plugin creating such a document may not be able to understand a document from another producer.

In various examples, guidelines are used to promote the understanding of a document. Information may be independent of a runtime model description and a theme (producer). Various layers (e.g., application, producer, user, etc.) of the system may create guidelines and attach them to a document. The guidelines may play impact a lifecycle of the document from its authoring or re-authoring to its live editing and its use (interaction/playback). De-coupling the document model from its guidelines may bring some generic definitions for complex unique document descriptions and may mitigate or solve challenges with previous slideshows technology and complexity across the different produced document with themes.

In various example, guidelines can be expressed for different family (type):
  Authoring (medias, suggested clusters, limit resolutions, couch potato settings, etc.)
  Runtime (last displayed page, unread pages, undiscovered features, etc.)
  Media (region of interests, tagged faces, captions, etc.)
  Producer (cluster, session cache, etc.)
  Canvas
  Any combination of the above (Runtime+Media: unread comments, Authoring, Producer, Canvas: manually set background, etc.)

Such guidelines may be attached outside of the document model and scripts in a specified section of a document and may transport a variety of types of information, following a model of: family, optional object (media, producer, or canvas), key, and value.

Some guidelines may be generic with their keys shared and accessible. Other guidelines may be internals or restricted to plugins. Such guidelines may be available for guiding multiple aspects. For instance, when re-authoring a document from a different producer plugin, some guidelines may be re-used, like captions user may have set on an image; it may be supported or not in the new plugin, it simply remains as a hint and will remain available for some or all of the life of the document, whatever its actual model representation. In a further example, when opening a page it knows about undiscovered touchable features.

A document may, in various examples, be regenerated from scratch (e.g., from an associated document model) out of the guidelines and the document's media. This may be useful as a security feature, as the document model may be a direct mapping of the runtime classes, sharing just media, guidelines, and signed with a plugin may be safer than a producer document model, for instance.

Live editing, such as adding a caption, tagging faces, defining a region of interest, etc., may create a guideline to be reflected in the document model by the producer. This information may remain available for the life of the document and may be used or not by the plugins depending of their scope and interest of these information.

The system may guide and help generalize the presentation of completely different documents at runtime for the player or application embedding the documents. One of use is called synopsis guideline (and authoring guideline). Such may be or may include a flatten hierarchy for presenting a high level chaptering navigation whatever the complexity of a document.

Some guidelines may be shared across multiple documents, like those related to media. The player itself may keep track of extended metadata of media guidelines for instance.

The system may include a view layout engine to show a "magic layout" that uses a list of steps to allow a superview to lay out subviews. Existing layout engines may range from very simple (auto-resizing masks, which may allow only very simple relationships between a view and its superview) to very complex layouts (constraints, which require to fully define relationships between subviews, and can conflict/compete with each other which requires a priority system to get resolved). The layout engine disclosed herein may allow a user to specify linear spatial relationships between subviews in a superview, as well as with the superview itself, allowing for even presentation of objects and media even as the superview resizes. Thanks to being a sequence of steps that each just update the view frames resulting from the previous steps, the view layout engine may avoid conflict and allows manual animations very simply.

The sequence of view layout engine steps may be run through some times or every time laying out is needed for a superview's subviews (for instance, when the geometry of the superview changes, steps may be added to the view layout engine, etc.). The implied default frame for subviews before any step has been run may be the same as the superview's default frame. The view layout engine may step and then incrementally modify these frames. The view layout engine and auto-resizing masks may be used together in the same superview. The view layout engine may only affect views that are the target view of one of more steps.

After being added to the sequence of steps, layout steps may still be mutable, so that the objects responsible for them can modify values to allow for animations without having to rebuild the whole sequence of steps. When the sequence is evaluated again, the updated values may be taken into account and the result may become different. The different result still may not yield a conflict. This allows, for example, implementing a split view very cheaply.

A layout step may be a command that alters the frame of a subview. The layout step may have a target view and an anchor view. The target view is the view of which frame will be affected, while the anchor view is used as the reference frame. It is possible for the anchor view to be the superview, the same as the target view (useful for setting the aspect ratio or shifting a view's position), or any other subview of the superview. A single layout step only operates in a single dimension, vertical or horizontal. A step may perform example operations of: move subview left 20 pixels; scale a subview's height to 50% of its superview, anchored to the bottom center; and align a subview's left edge at a sibling's right edge.

In various example, a layout step is defined by the following parameters:
  target view: the view which frame will be modified by the step;
  targetAttribute: the attribute of the target view's frame that will be modified by the step (x, y, width, height);
  targetSizeMultiplier: for x and y, the normalized ([0 . . . 1]) coordinate of the point in the target view's frame that's being set (0 represents the left/top edge, 1 represents the right/bottom edge);

relation: the mathematical relationship that the step wants to enforce: equal, less than or equal (set to only if value is greater than required), greater than or equal (set to only if value is less than required);

anchor view: the view which frame serves as the reference for the step;

anchorAttribute: the attribute of the anchor view's frame that serves as the reference for the step;

anchorSizeMultiplier: for x and y, the normalized ([0 . . . 1]) coordinate of the point in the anchor view's frame that's used as the reference;

multiplier: the factor to apply to the reference value; and constant: the offset to apply to the reference value;

In an example, the step may be executed by computing the value from the anchor parameters and applying the value to the target's attribute. In an example, the target view starts with a width of 100 (width of the parent) and the layout steps say to set the left edge of the target view to 20 and the right edge of the target view to 80. Since view frames may be defined by their origin and size, if the steps were applied as is, the left edge of the target view would be set to 20 (x=20, width=100) and then set the right edge of the target view to 80 (x=−20, width=100), which may not be the expected result (x=20, width=60), which may derive from the fact that there are three things that can be set (left edge, right edge, width, and even more if all normalized coordinates between the left and right edges are accounted for, but these three are the most common) but only two real degrees of freedom (the x-axis and width).

To solve this ambiguity, the additional convention may be added that, for a given dimension, if two consecutive steps (for that dimension) set x or y for different targetSizeMultipliers, this ends up setting the width or height so that those two steps are fulfilled. So for the above example, the first step may set the target view to (x=20, width=100) but the second one, being the second consecutive step in the horizontal dimension setting x, may actually set the width so that both the first step and the second step are fulfilled, giving the expected (x=20, width=60).

Layout steps may be defined using a layout string following a simple format referencing the target view and the anchor view, which may provide for relatively easy creation and legibility. Such a string format may support one-dimensional step description and two-dimensional step description (in which case a single string may define two layout steps). Example descriptions are as follow:

2D: t.(size|location)((x,y))?=(a.(size|location(x,y)?)?(*(x,y))?)?(+(x,y))?

1D: t.(width|height|x|y)((x))?(=|<=|>=)(a.((width|height)|(x|y)(x)?)(*m)?)?(+

Inequalities (<=, >=) may be used, giving the "less than or equal" and "greater than or equal" relations above.

An example one-dimension string format may be "t.x(0)=50" which sets the left edge of the target view to 50. Another example may be "t.x(1)=50." This example string sets the right edge of the target view to 50. The number in parenthesis is a normalized coordinate in the view that should be set to 50. In the example, zero is assumed if the coordinate is omitted. The origin of the normalized coordinate is the same as the frame origin.

t.width=a.width
t.width=a.width*2
t.width=a.width+10
t.width=a.width*2+10
t.width=a.height*2

If the same view for both the anchor and the target is used, this layout string makes the aspect ratio of the view 2:1: t.width>=a.height*2. If the layout string is an inequality, the step may only run if the inequality is not satisfied. This step ensures the width is at least twice the height.

A two-dimensional string format example may be "t.x (0.5)=a.width*0.5." If the anchor is the superview, this horizontally centers the target view in its superview. The same thing, but in 2D: t.location(0.5,0.5)=a.size*(0.5,0.5)

The following disclosure relates to a technique to express global and typed actions to be generated from an playing device as provided by the system or a remote peer (e.g., a remote control) through events or direct triggers in order to be recognized and interpreted by the system document playback, such as from runtime bindings or from described document (XML/JS) bindings.

The system may run on multiple platforms, such as an operating system, the Web, or on particular devices, such as desktop and laptop computers, tablet computers, handheld devices, and so forth. User interface devices may receive events/gestures and user experience (e.g., mouse, trackpad, multi-touch screen, motion gyroscope, remote control buttons, etc.). However, the meaning or intent of such gestures in a particular document may require interpretation. The expression of the document in XML/JS to map native iOS, OSX and Web technology (like UIKit, AppKit, . . . ) may include the need to express interaction through bindings responding to defined actions in a relatively more abstract language.

Depending on the user interface and the components of the user interface being utilized, actions may be events or gestures related such as "tap", "long press", "swipe", "pan", etc., but may also be simply be action-named, such as "menu", "next", "previous", etc. Different devices' interactions may be abstracted to common denominators if possible but may also support direct typed actions, both with identified needed information for use by a binding responder. An action may be crafted locally or remotely by design (providing a common transport flow between devices or between applications and so forth) and sent for recognition to registered bindings. In an example, a remote control could be used to provide motion feedback to the playing document on a television application (e.g., AppleTV) to scroll when rotated or interact with parallax when tilted. Actions may also be one-shot or interactive for progressive needs. An action may be local or remote, bindings could be set to filter and respond to one or the other or both to accommodate control.

Action bindings may be registered to visual objects from the user interface to provide interactivity. Action bindings may provide support to respond to an action only and/or may provide a platform specific gesture recognizer mechanism to generate actions and perform them directly. When actions are sent independently of the Action Bindings gesture recognizers, the actions may follow the object hierarchy chain until a binding responds to it or some party stops the propagation.

Figure 7:
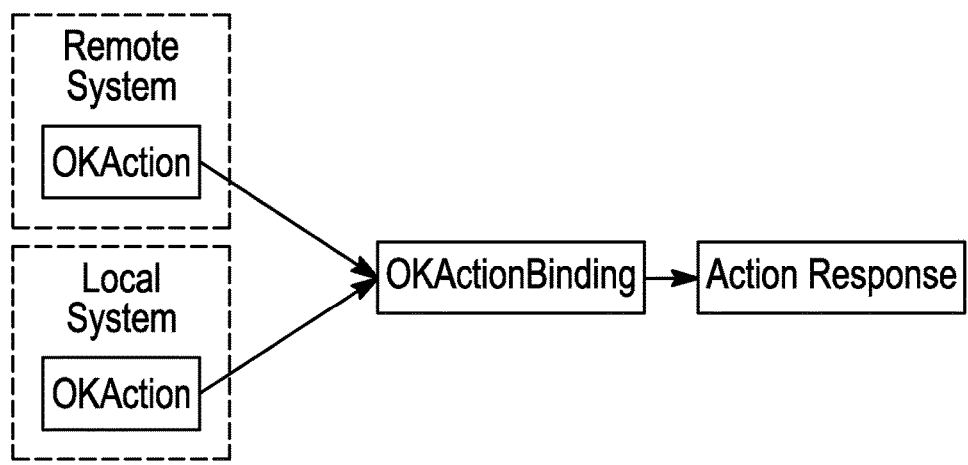
FIG. 7 illustrates a schema of actions received from local and remote systems, according to an example embodiment.
Figure 8:
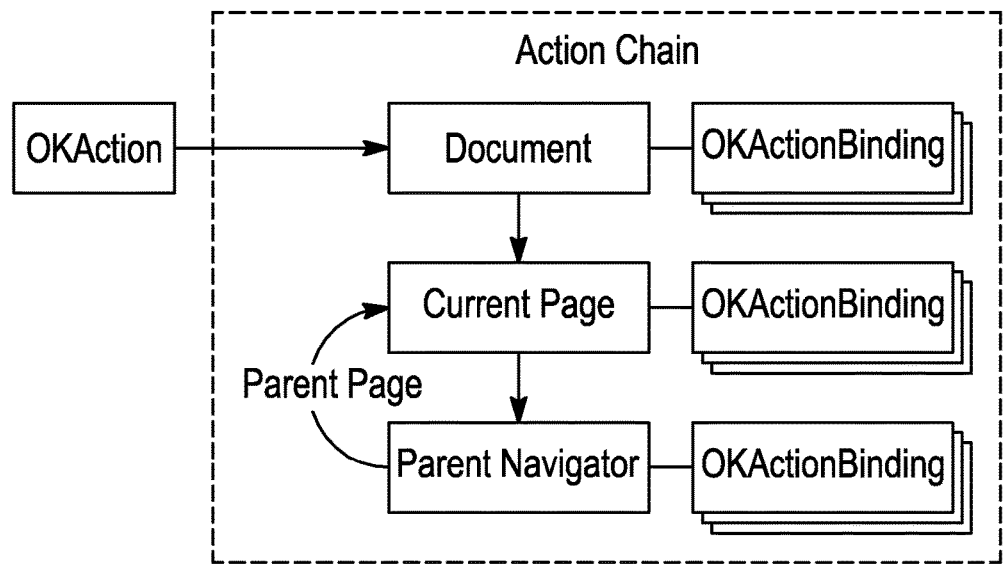
FIG. 8 illustrates a schema of an action chain, according to example embodiment.
Figure 9:
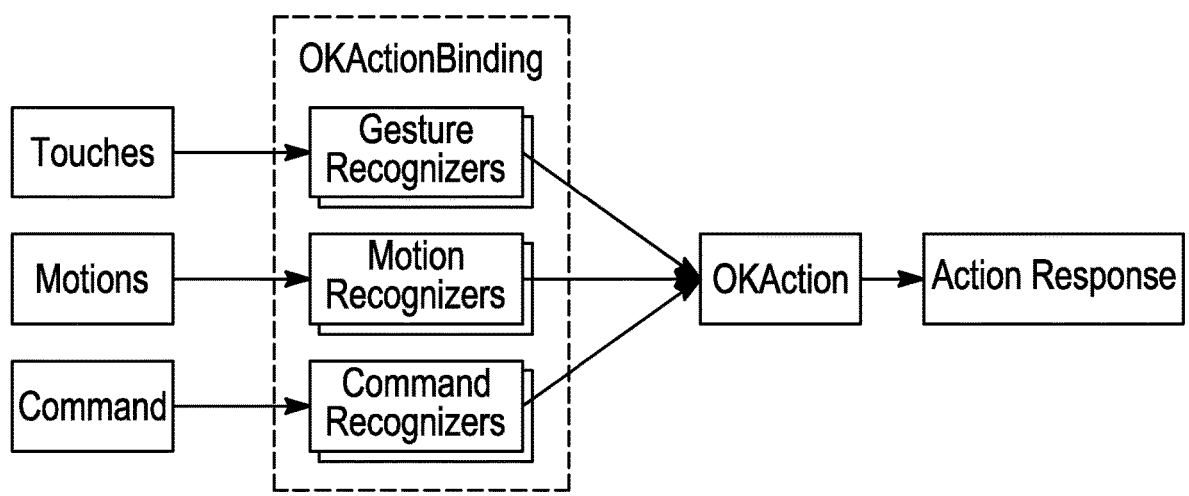
FIG. 9 illustrates a scheme of different types of actions, according to an example embodiment.
Figure 10:
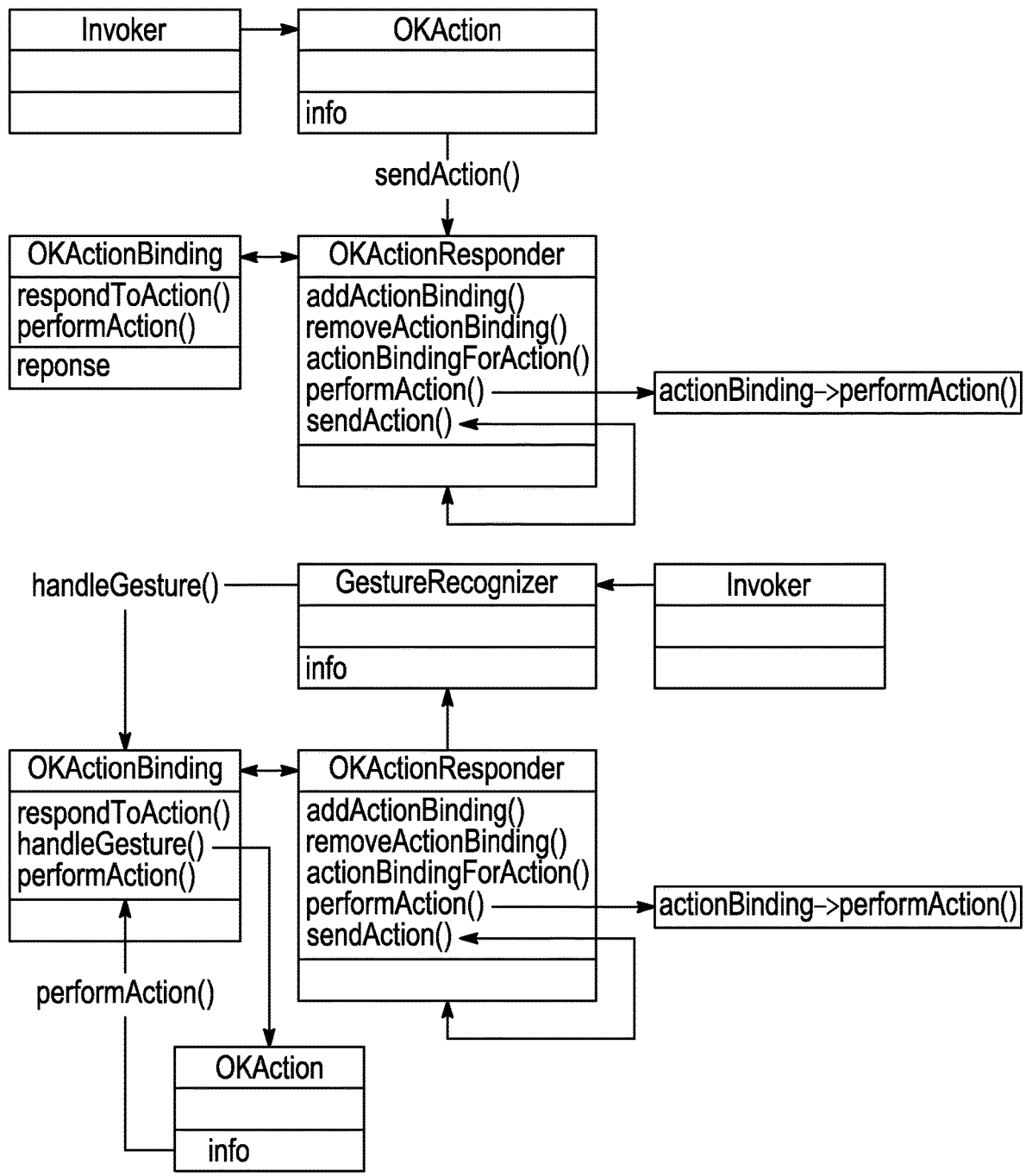
FIG. 10 illustrates an events/actions/bindings/responder schema, in an example embodiment.

FIGS. 7, 8, and 9 illustrate an events/actions/bindings/responder chain schema, in example embodiments. FIG. 7 illustrates actions received from local and remote systems. FIG. 8 illustrates an action chain. FIG. 9 illustrates different types of actions. FIG. 10 illustrates events/actions/bindings/responder chain design pattern, in an example embodiment.

The system may be able to, at the command of the user or any automatic action (coming for example from the couch potato script, as disclosed herein), go to specific pages, specific widgets, in specific states, using a smooth animation. The system may create documents having an imbrication of navigators, pages, and widgets, though navigating and animating to a given object may not be straightforward. The requested object may be in a completely different part of the hierarchy, or in a state that doesn't allow it to display it as is.

Navigating to such an object may utilize or require multiple intermediate objects (navigators and pages) to know what to do in order to achieve an aesthetically pleasing animation targeting the object: navigators may transition to a different page than the current one or make the current page scroll to a specific offset, pages may animate objects to show or get out of the way, the target widget itself may put itself in a specific state, and so forth.

In order to be navigated to, an object may have an "address" that can be absolute (from the root of the document) or relative (from a given object in the hierarchy). For addresses, the system may use key paths. Key paths may be strings that are composed of keys (alphanumerical words) separated by dots. Each word in the key path may serve as a key to what action to perform when received by the right object. Such strings may be comparatively secure and simple to store at document authoring time or dynamically.

When an object (navigator, page, widget) is asked to "go to" a keyPath, the object may take the left-most key out of the keyPath and processes the key through a hardcoded behavior dependent on its type/class or a dynamically-evaluated script (called a navigation script).

For a navigator, the key may be the name of the page to show (the page where eventually the object to navigate to will appear), or the name of an anchor (a widget or a dedicated anchor object) to scroll to in the contained scrollable page. How to interpret the key may be left up to the navigator, different navigator behaviors being achieved through different navigator types or custom navigation scripts.

For a page the key can be the name of a widget or an embedded navigator to get into view by, for example, animating away obstructing objects in the page. For a widget that is being navigated to, the key can be the name of a state to put the widget into, or an indication to restart an animation. A custom navigation script may also trigger side actions not central to the navigation itself but which enhance the navigation experience (like playing sound effects or extra visual effects specific to the navigation).

In an example, at each stage, as long as there are keys remaining in the key path, and after handling the first key in the key path, the object (or its navigation script) may decide to pass the remainder of the key path to the appropriate child object (the page being navigated to or the widget being targeted) for proper handling, or to process the next key. Processing the next key may give flexibility as to where the navigation behavior can be implemented and may not requiring all hierarchical levels to, for example, have their own custom script.

Objects may be "smart" and react to a "navigate to" command in ways that can depend on a current state of the object. In an illustrative example, it may be desired to go to widget 7 in page 2 of navigator 0, where page 2, widget 7 is not visible. If navigator 0 is already showing page 2, page 2 may animate widget 7 into view. But if navigator 0 is not showing page 2, but page 1, navigator 0 may to transition to page 2 with page 2 already showing widget 7, not requiring the extra animation of widget 7 into view.

The above example may be achieved by passing in a Boolean "animate" flag to the navigateTo function of each object. navigator 0 may set this flag to YES, but may then pass YES to page 2's navigateTo function only if it didn't have to animate to page 2 because widget 7 was already shown.

In an illustrative example, the main navigator of a document receives the call" navigateTo: "page2.scrollingNavigator.funnySign.imageAtTheBack" animate:YES. The main navigator may be a standard navigator that transitions between pages and may know about page 2, so the main navigator may trigger a transition to page 2 (if not already shown) while passing page 2 the remainder of the key path "scrollingNavigator.funnySign.imageAtTheBack", and passes animate:NO if transitioning, animate: YES if page 2 was already shown.

Page 2 may know page 2 contains a scrolling navigator called scrollingNavigator, so page 2 makes sure that, for instance, an animated cloud that is in front of widget 7 goes away (by triggering an animation if animate:YES, or just hiding the cloud if animate:NO) and passes it the remainder of the key path "funnySign.imageAtTheBack". Whether page 2 passes animate:YES or NO depends on whether page 2 was animating, and whether the animated cloud was only partially obscuring scrollingNavigator or not (if page 2 knows that scrollingNavigator was only partially obscured, page 2 may ask scrollingNavigator to animate too so that everything looks smooth).

scrollingNavigator may make its inner scrollable page scroll (if animating) or jump (if not animating) so that funnySign is centered in scrollingNavigator (or any other appropriate position defined when authoring the document) and passes the remainder of the key "imageAtTheBack" to funnySign.

funnySign may be a widget that knows that imageAtTheBack means it has to flip to show its back, so depending on whether the widget should animate or not as requested by scrollingNavigator, the widget animates the flip or just displays its back directly.

Because all this happens at the same time, what may be perceived by the user is a single, smooth animation that takes the user directly to watching imageAtTheBack on funnySign at the center of very large page 2 after the user has transitioned from another page.

The automatic playback ("couch potato") mode may playback a slideshow or other navigation/animation-based document automatically with the user passively watching and without necessarily interacting with the playback. If the user does interact with the document, playback may be suspended but then resume where the user left off, in contrast with where the script left off at the time of interruption.

To schematize, a document may be represented as a number of pages that are containers for graphical and non-graphical elements called widgets (images, maps, text, animated sprites etc.). Another type of container, called a navigator, may include pages and allows navigation between them or within them. Pages can also contain navigators, making the hierarchy recursive.

In automatic playback mode, navigation in the document and animations may be controlled by an automatic playback script, made of a sequence of automatic playback steps. These steps can be hardcoded actions defined by keyword or dynamically-executed scripts (for example in JavaScript) controlling the various objects making the visual representation of the document onscreen as well as the flow of the automatic playback script. An entirety of an object model of the document may be accessible and controllable through the scripts which may make the possibilities substantially unbounded as to what actions/animations/behaviors within the document can be triggered through the automatic playback.

Automatic playback steps may executed by default in sequence, and triggered by: predefined timing (for example every three seconds); dynamic timing (the step dynamically decides how long to wait before executing the next step, for example wait longer before navigating to the next page when showing a picture with a higher user rating); and automatically generated events like a completion handler on a movie/animation finishing playing.

The triggering of the steps can also be overridden and controlled by an external sequencer, allowing for example to schedule the steps according to a music beat or any other external event source. Examples of automatic playback steps include: tell a navigator to navigate to another page; scroll a currently-showing page to a different position; start music/sound effects; and start animations of widgets.

In a basic usage of the automatic playback mode, the script may be just a sequence of steps each telling the main navigator of the document being played to transition to a given page showing a different image, and then wait for a given time before going to the next step and execute the step.

Because the automatic playback script may be event-driven, the script may be controlled and may trigger behaviors in the same way user interactions can, as opposed to a completely time-driven playback experience that would leave no space for spontaneity or non-linear playback.

Some automatic playback steps can implement control flow by dynamically deciding what step to execute next depending on a condition related to the currently playing document and/or page (e.g., if the document is setup to automatically loop) or an external event, allowing implementation for example of looping in navigation (after having played up to the end of a document, playback loops back to the beginning and starts again). An automatic playback step may also loop onto itself, in essence retriggering itself until a condition is met, allowing for tight loops over similar objects in the script.

In an example, the automatic playback may implement interactive stacks of widgets that can be shuffled through either by the user interactions or by the automatic playback script, which can thanks to this kind of step loop through the widgets to animate the widgets appropriately.

If a user begins interacting with the document, automatic playback mode may be suspended. Automatic playback mode may be resumed later either explicitly by the user or after a certain time of non-interaction from the user. When the automatic playback mode resumes, the automatic playback mode determines which step in the automatic playback script is closest to the current state of the playback experience following the user interaction, and resumes from that step. Resumption can be done, for example, by relating some steps to specific pages (the step may be labeled the automatic playback anchor of the page), so on resuming automatic playback mode while viewing a given page, that page's anchor step may be used as the step from which to resume.

Management of the state of the page and its use by the automatic playback step's script allows for complex behaviors that takes into account the history of what already happened, including through user action. In an example, a page of a document that shows three panorama images which are panned automatically (e.g., through automatic playback steps triggering each panning animation or through user selection) in turn so the user can see them fully. In an example playback session the first panorama image pans automatically, but then the user starts interacting with the second panorama image, panning it themselves, and then stops interacting again. After a while automatic playback mode resumes to the anchor step of the page, which goes to panning the first panorama image, sees that the first panorama image has already been panned, skips to panning the second panorama image, sees that the second panorama image too has already been panned (albeit manually), and begins panning the third panorama image, which has not yet been panned.

A given document may have several automatic playback scripts, which allows a user to experience a document in several ways. Two distinct automatic playback scripts can be different, for example, in which pages they navigate too, the order in which that navigation is done, whether or not certain animations are triggered, and so forth. In an example, a "trailer" or "preview" of a document may be implemented as one script while a full implementation of the document may be implemented as a second script. The "trailer" script may offer a summary playback of the document, for example through a short playback navigating only through the main assets of the document.

In an example, a document includes one hundred pictures a user took during a special event. The main script may detail how to show each and every one of the one hundred pictures, including extra steps showing texts, maps, animations, and so forth, to make for a full experience. In an example, the "trailer" script may be generated with only the five best-rated images and very simple animations in order to show a very quick preview of the whole document, to feature in a list of all available documents of all previous events.

In an example a system may comprise: an electronic data storage configured to store an operating system, a media application, and media items, the operating system including a feature and a class; a processor, coupled to the electronic data storage, configured to: execute the operating system; execute the media application; using the media application, utilize at least one of the feature and the class of the operating system and an abstraction described in a markup language to create a document incorporating at least one of the media items, the document being configured to be displayed on and interacted with via a user interface, wherein the at least one of the feature and the class is utilized without abstraction.

In an example a system may comprise an electronic data storage configured to store a media application and media items, the media application including a plugin component and a core component; a processor, coupled to the electronic data storage, configured to: generate, using the plugin component of the media application, an interactive document including at least one of the media items, the core component being substantially unrelated to the generation of the interactive document; execute the interactive document for display on a user interface using the core component and without respect to the plugin component.

In an example a system may comprise: an electronic data storage configured to store a media application and media items, the media application configured to generate an interactive document including at least one of the media items and implement the interactive document on a user interface; a processor, coupled to the electronic data storage, configured to: generate, using the media application, an interactive document including at least one of the media items and at least two interactive steps, the interactive document including a superview for display of content and at least one subview for display of the at least one of the media items, the subview having a linear spatial relationship to the superview; execute the interactive document for playing on a user interface, wherein, upon resizing the superview, the subview is resized proportionally without substantially interrupting a playing the interactive document, and wherein, upon inserting a third step with respect to the at least two steps, the at least one of the media items continues to play substantially without interruption.

In an example a system may comprise: an electronic data storage configured to store a media application configured to execute an interactive document based on a predetermined set of denominator commands; a user interface configured to display the interactive document and receive user inputs related to the interactive document from any one of a plurality of input devices; and a processor, coupled to the electronic data storage and the user interface, configured to: receive a user input from the user interface based on gesture detected by one of the plurality of user input devices; execute the interactive document according to the user input as mapped to one of the predetermined set of denominator commands based, at least in part, on the one of the plurality of input devices; receive a direct typed command from the user interface; and execute the interactive document according to the user input as mapped to the one of the predetermined set of denominator commands.

In an example a system may comprise: an electronic data storage configured to store a media application configured to execute an interactive document that includes a media item; and a processor, coupled to the electronic data storage, configured to: receive, from the media application, a command to animate the media item as part of executing the interactive document; implement a key path to animate the media item, the key path including a string of keys to be executed in sequence, at least one of the keys identifying a location of the media item and at least one of the keys identifying an action to be implemented by the media item.

In an example a system may comprise: an electronic data storage configured to store a media application configured to execute an interactive document that includes a plurality of media items; and a user interface configured to receive user inputs related to the interactive document; a processor, coupled to the electronic data storage, configured to: automatically execute the interactive document by sequentially accessing individual media items according to a script; suspend automatic execution of the interactive document upon receipt of a first user input; access individual ones of the media items based on subsequent user inputs of the individual ones of the media items; and resume automatic execution of the interactive document according to the script and the individual ones of the media items as accessed based on the user input.

Figure 11:
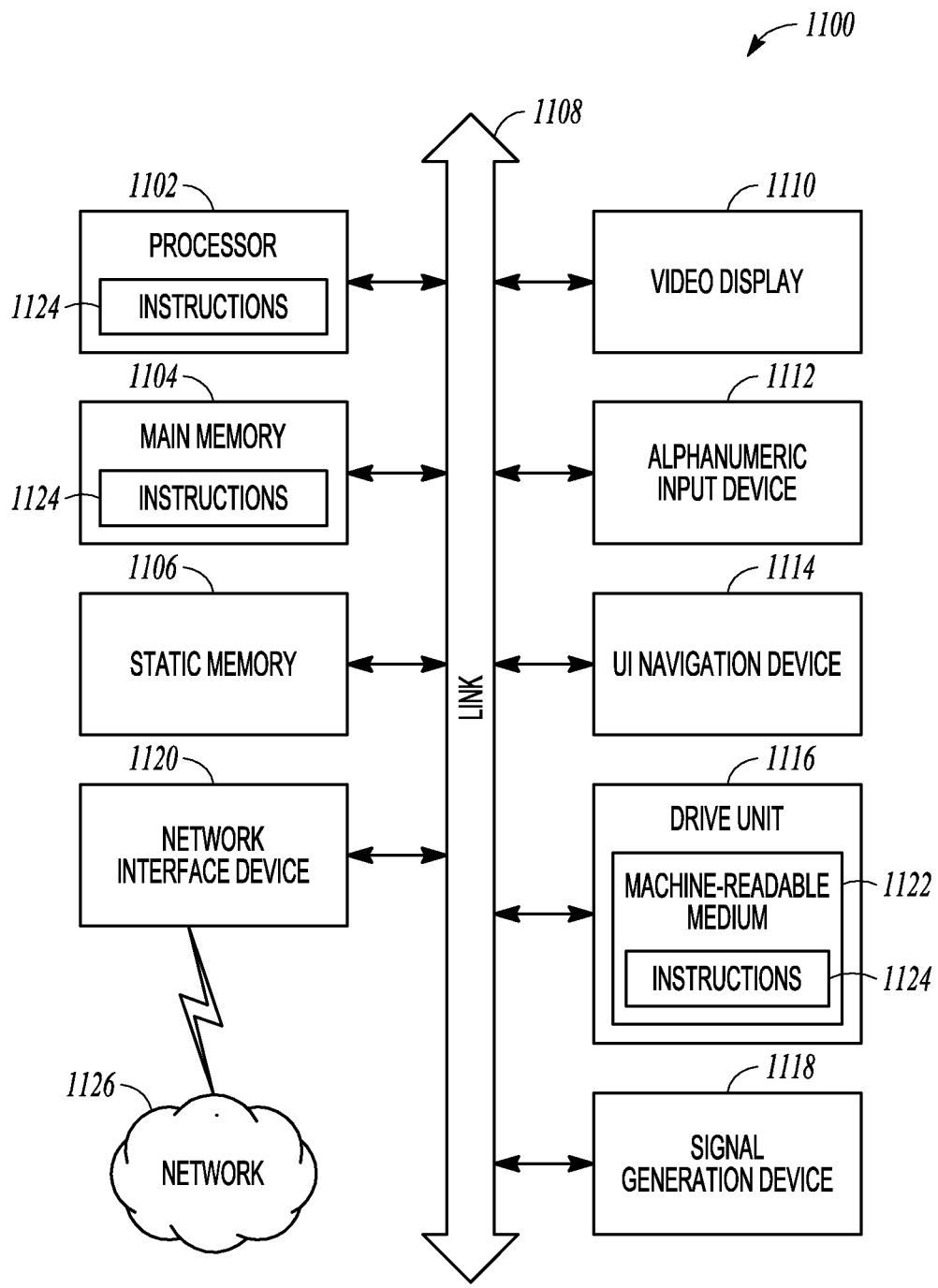
FIG. 11 is a block diagram illustrating an example machine upon which any one or more of the techniques (e.g., methodologies) discussed herein may be performed, according to an example embodiment.

FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system and within which instructions 1124 (e.g., software) for causing the machine 1100 to perform any one or more of the methodologies discussed herein may be executed. In alternative embodiments, the machine 1100 operates as a standalone device or may be connected (e.g., networked) to other machines. In a networked deployment, the machine 1100 may operate in the capacity of a server machine or a client machine in a server-client network environment, or as a peer machine in a peer-to-peer (or distributed) network environment. The machine 1100 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1124, sequentially or otherwise, that specify actions to be taken by that machine. Further, while only a single machine is illustrated, the term "machine" shall also be taken to include a collection of machines that individually or jointly execute the instructions 1124 to perform any one or more of the methodologies discussed herein.

The machine 1100 includes a processor 1102 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1104, and a static memory 1106, which are configured to communicate with each other via a bus 1108. The machine 1100 may further include a graphics display 1110 (e.g., a plasma display panel (PDP), a light emitting diode (LED) display, a liquid crystal display (LCD), a projector, or a cathode ray tube (CRT)). The machine 1100 may also include an alphanumeric input device 1112 (e.g., a keyboard), a cursor control device 1114 (e.g., a mouse, a touchpad, a trackball, a joystick, a motion sensor, or other pointing instrument), a storage unit 1116, a signal generation device 1118 (e.g., a speaker), and a network interface device 1120.

The storage unit 1116 includes a machine-readable medium 1122 on which is stored the instructions 1124 (e.g., software) embodying any one or more of the methodologies or functions described herein. The instructions 1124 may also reside, completely or at least partially, within the main memory 1104, within the processor 1102 (e.g., within the processor's cache memory), or both, during execution thereof by the machine 1100. Accordingly, the main memory 1104 and the processor 1102 may be considered as machine-readable media. The instructions 1124 may be transmitted or received over a network 1126 via the network interface device 1120.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1122 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 1100), such that the instructions, when executed by one or more processors of the machine (e.g., processor 1102), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance.

What is claimed is:

1. A method comprising:
    retrieving a markup language document from an electronic storage device that resides on a playback device, the markup language document defining:
        a visually-displayed component of an interactive media application configured to run as a native application on the playback device;
        a plurality of platform dependent parameter sets for the component, each platform dependent parameter set being configured to control how the component reacts to user input specific to a particular platform type and user input devices available on the particular platform type;
        a script to execute based on a platform agnostic interaction type; and
        a plurality of resolution dependent parameter sets for the component;
    determining, using at least one processor, a current resolution of a display device of the playback device;
    selecting, using the at least one processor, a resolution parameter set of the plurality of resolution dependent parameter sets for the component based on the current resolution;
    determining, using the at least one processor, a platform type of the playback device;
    updating, using the at least one processor, the script to include platform specific interaction code based on the determined platform type of the playback device;
    configuring, using the at least one processor, the interactive media application to apply the resolution parameter set to the component upon execution; and
    executing, using the at least one processor, the interactive media application, the executing causing the component to be presented according to the resolution parameter set on the playback device, the executing comprising retrieving and displaying user media content from the electronic storage device that resides on the playback device.

2. The method of claim 1, wherein the component of the interactive media application is a display frame and wherein the resolution parameter set identifies a position of the display frame.

3. The method of claim 1, wherein the component of the interactive media application is a text box and wherein the resolution parameter set identifies a font size for use in the text box.

4. The method of claim 1, wherein each platform dependent parameter set defines:
    at least one action binding registered to one or more visual objects of the component to provide user interactivity, the at least one action binding being specific to a particular platform type; and
    an action performed in response to user interaction with the at least one action binding.

5. The method of claim 4, further comprising:
    selecting a platform dependent parameter set of the plurality of platform dependent parameter sets based on the determined platform type; and
    applying the platform dependent parameter set to the component upon execution.

6. The method of claim 1, further comprising:
    detecting a resolution change of the playback device to a different resolution;
    selecting a new resolution parameter set of the plurality of resolution dependent parameter sets for the component based on the different resolution; and
    applying the new resolution parameter set to the component.

7. The method of claim 1, wherein the markup language document defines a script to execute when user interaction with the interactive media application has ceased for a threshold amount of time.

8. The method of claim 5, wherein the at least one action binding is also specific to a particular resolution dependent parameter set, and wherein the action performed in response to the user interaction with the at least one action binding is different based on a current orientation of the display device of the playback device.

9. A system comprising:
    at least one processor;
    at least one electronic storage device that resides on a playback device, the electronic storage device configured to store:
        a markup language document, the markup language document defining:
            a visually-displayed component of an interactive media application configured to run as a native application on the playback device, wherein the component corresponds to a native class of the playback device, wherein the native class is native to an operating system or a toolkit of the playback device;
            a plurality of platform dependent parameter sets for the component, each platform dependent parameter set being configured to control how the component reacts to user input specific to a particular platform type and user input devices available on the particular platform type;
            a script to execute based on a platform agnostic interaction type; and
            a plurality of resolution dependent parameter sets for the component; and
    an interactive media engine which, when executed by the at least one processor, is configured to perform operations comprising:
        determining a current resolution of a display device of the playback device;
        selecting a resolution parameter set of the plurality of resolution dependent parameter sets for the component based on the current resolution;
        determining a platform type of the playback device;
        updating the script to include platform specific interaction code based on the determined platform type of the playback device; and
        configuring the interactive media application to apply the resolution parameter set to the component upon execution; and the interactive media application which, when executed by the at least one processor, is configured to:
  present the component according to the resolution parameter set on the playback device;
  retrieve user media content from the electronic storage device that resides on the playback device; and
  display the user media content.

10. The system of claim 9, wherein the component of the interactive media application is a display frame and wherein the resolution parameter set identifies a position of the display frame.

11. The system of claim 9, wherein the component of the interactive media application is a text box and wherein the resolution parameter set identifies a font size for use in the text box.

12. The system of claim 9, wherein each platform dependent parameter set defines:
  at least one action binding registered to one or more visual objects of the component to provide user interactivity, the at least one action binding being specific to a particular platform type; and
  an action performed in response to user interaction with the at least one action binding.

13. The system of claim 12, wherein the operations further comprise:
  selecting a platform dependent parameter set of the plurality of platform dependent parameter sets based on the determined platform type; and
  applying the platform dependent parameter set to the component upon execution.

14. The system of claim 9, wherein the operations further comprise:
  detecting a resolution change of the playback device to a different resolution;
  selecting a new resolution parameter set of the plurality of resolution dependent parameter sets for the component based on the different resolution; and
  applying the new resolution parameter set to the component.

15. The system of claim 9, wherein the markup language document defines a script to execute when user interaction with the interactive media application has ceased for a threshold amount of time.

16. The system of claim 13, wherein the at least one action binding is also specific to a particular resolution dependent parameter set, and wherein the action performed in response to the user interaction with the at least one action binding is different based on a current orientation of the display device of the playback device.

17. A non-transitory computer-readable medium comprising instructions, which when executed by at least one processor, cause the at least one processor to perform operations, the operations comprising:
  retrieving a markup language document from an electronic storage device that resides on a playback device, the markup language document defining:
    a visually-displayed component of an interactive media application configured to run as a native application on the playback device;
    a plurality of platform dependent parameter sets for the component, each platform dependent parameter set being configured to control how the component reacts to user input specific to a particular platform type and user input devices available on the particular platform type;
    a script to execute based on a platform agnostic interaction type; and
    a plurality of resolution dependent parameter sets for the component; determining a current resolution of a display device of the playback device;
  selecting a resolution parameter set of the plurality of resolution dependent parameter sets for the component based on the current resolution;
  determining, using the at least one processor, a platform type of the playback device;
  updating, using the at least one processor, the script to include platform specific interaction code based on the determined platform type of the playback device;
  configuring, the interactive media application to apply the resolution parameter set to the component upon execution; and
  executing, the interactive media application, the executing causing the component to be presented according to the resolution parameter on the playback device, the executing comprising retrieving and displaying user media content from the electronic storage device that resides on the playback device.

18. The non-transitory computer-readable medium of claim 17, wherein each platform dependent parameter set defines:
  at least one action binding registered to one or more visual objects of the component to provide user interactivity, the at least one action binding being specific to a particular platform; and
  an action performed in response to user interaction with the at least one action binding.

19. The non-transitory computer-readable medium of claim 18, the operations further comprising:
  selecting a platform dependent parameter set of the plurality of platform dependent parameter sets based on the platform type; and
  applying the platform dependent parameter set to the component upon execution.

20. The non-transitory computer-readable medium of claim 17, the operations further comprising:
  detecting a resolution change of the playback device to a different resolution;
  selecting a new resolution parameter set of the plurality of resolution dependent parameter sets for the component based on the different resolution; and
  applying the new resolution parameter set to the component.

* * * * *